2 Sheets--Sheet 1.

EDWARD FITZHENRY.

Improvement in Machinery for Dressing Hides or Leather.

No. 118,002. Patented August 15, 1871.

Witnesses
S. N. Piper
L. Nittöller

E. Fitzhenry
by his attorney
R. H. Eddy

2 Sheets--Sheet 2.

EDWARD FITZHENRY.

Improvement in Machinery for Dressing Hides or Leather.

No. 118,002. Patented August 15, 1871.

Witnesses.
S. N. Piper
L. N. Möller

E. Fitzhenry
by his attorney 120,002

UNITED STATES PATENT OFFICE.

EDWARD FITZHENRY, OF BOSTON, MASSACHUSETTS, ASSIGNOR TO HIDE AND LEATHER MACHINE COMPANY, OF SAME PLACE.

IMPROVEMENT IN MACHINES FOR DRESSING HIDES.

Specification forming part of Letters Patent No. 118,002, dated August 15, 1871.

*To all whom it may concern:*

Be it known that I, EDWARD FITZHENRY, of Boston, of the county of Suffolk and State of Massachusetts, have invented a new and useful Improvement in Machinery for Dressing Hides or Leather; and do hereby declare the same to be fully described in the following specification and represented in the accompanying drawing, of which—

Figure 1:
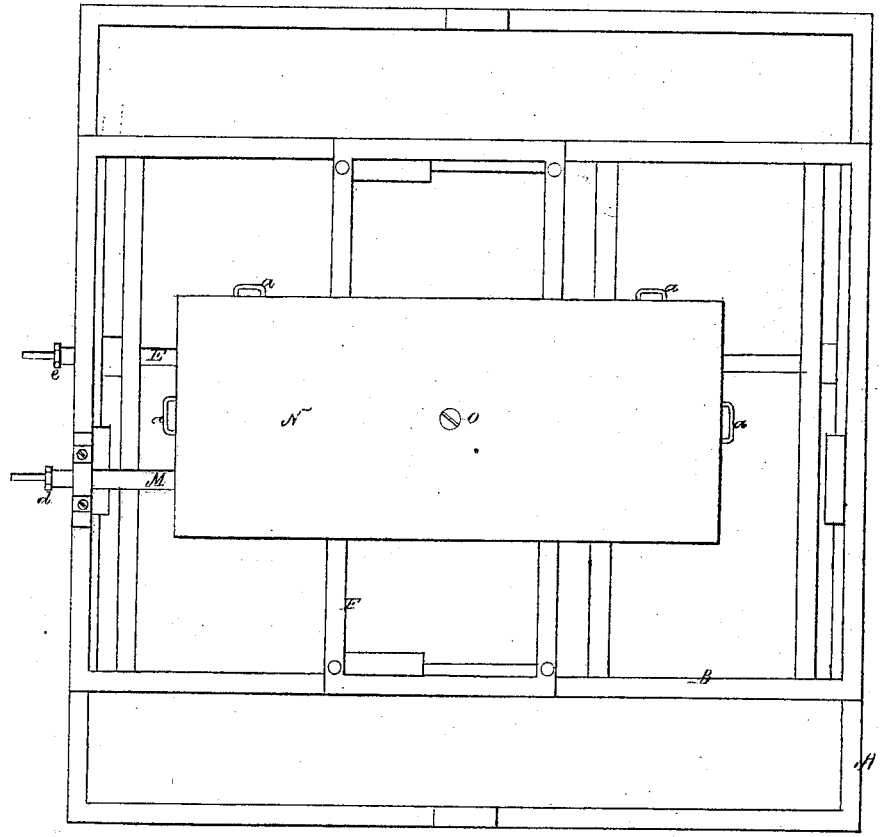
Figure 2:
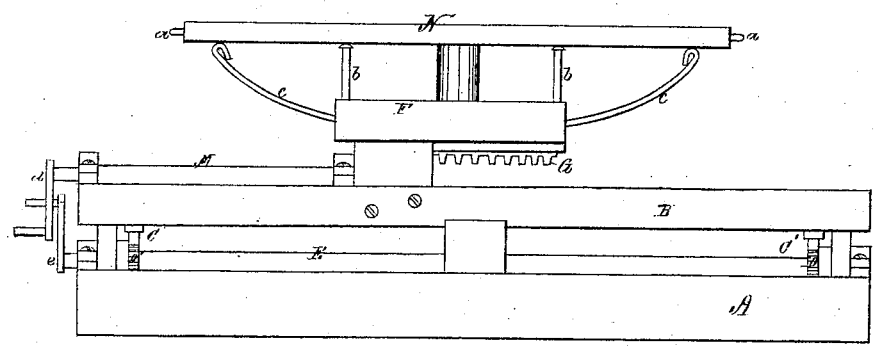
Figure 3:
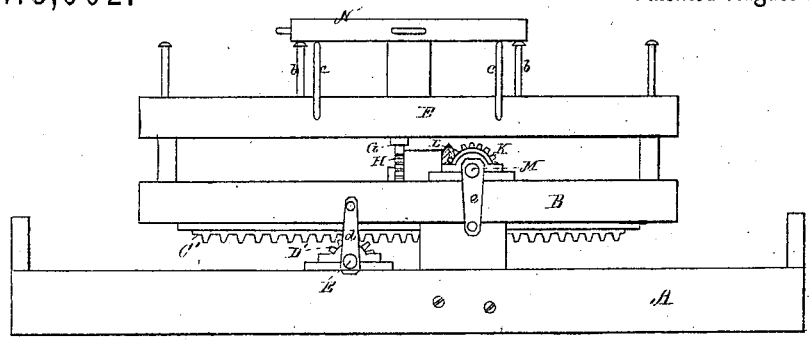
Figure 4:
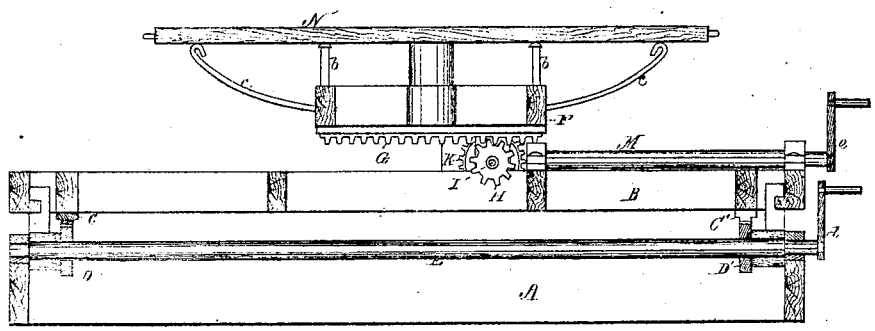
Figure 5:
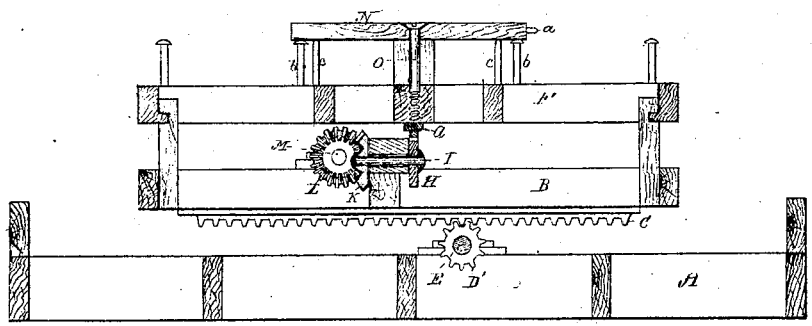

Figure 1 is a top view, Fig. 2 a front elevation, Fig. 3 an end view, Fig. 4 a longitudinal section, and Fig. 5 a transverse section of my new or improved mechanism for actuating the table of a leather-dressing machine.

In such drawing, A denotes a rectangular frame, which I term the bed-frame. This frame has over it, and applied to it so as to be guided rectilinearly in its movements both forward and backward, another frame or carriage, B. To this latter carriage, near its opposite ends, two toothed racks, C C', are fixed, to engage with two gears or pinions, D D', fixed on a shaft, E, supported in boxes sustained by the base-frame. Above the carriage B, supported by it and so applied to it as to be movable rectilinearly in a path at right angles with that of the said carriage, is another carriage, F, whose rectilinear movement in either direction is controlled and produced by a rack, G, a spur-gear, H, a shaft, I, bevel-gears K L, and a shaft, M, all, with the exception of the rack, being applied together and to the carriage B, and arranged therewith in manner as represented. Furthermore, there is pivoted to the said carriage F a rotary table, N, the pivot being at the center of such carriage and table as shown at O. The said table is to be capable of being revolved horizontally, and is furnished at its ends and sides with handles, as shown at *a*. In order to support the table in different positions in which it may be placed from time to time I provide the carriage F with standards *b b b b* and projecting arms *c c c c*, arranged as represented. To each of the driving-shafts there is a crank, as shown at *d* and *e*.

An attendant to operate the carriages seizes the cranks with his hands, and by revolving them produces simultaneous movements of the two carriages. The dressing or slicking-tool or tools are supposed to be mounted and operated in the usual manner over the rotary table on which the hide or skin to be worked by such tool or tools is to be placed, such table being revolved by manual power, and moved either in one direction or at right angles therewith, as occasion may require, to bring the hide or skin from time to time to the necessary positions to be dressed.

I claim—

The arrangement and combination of the two carriages B F, the base-frame A, the rotary table N, and the mechanisms substantially as described, viz., the racks, gears, and shafts, for actuating such carriages, all being applied together substantially in manner and so as to operate as specified.

EDWARD FITZHENRY.

Witnesses:
 R. H. EDDY,
 J. R. SNOW.